(No Model.)
J. B. BRAY.
VELOCIPEDE SLEIGH.
No. 256,634. Patented Apr. 18, 1882.
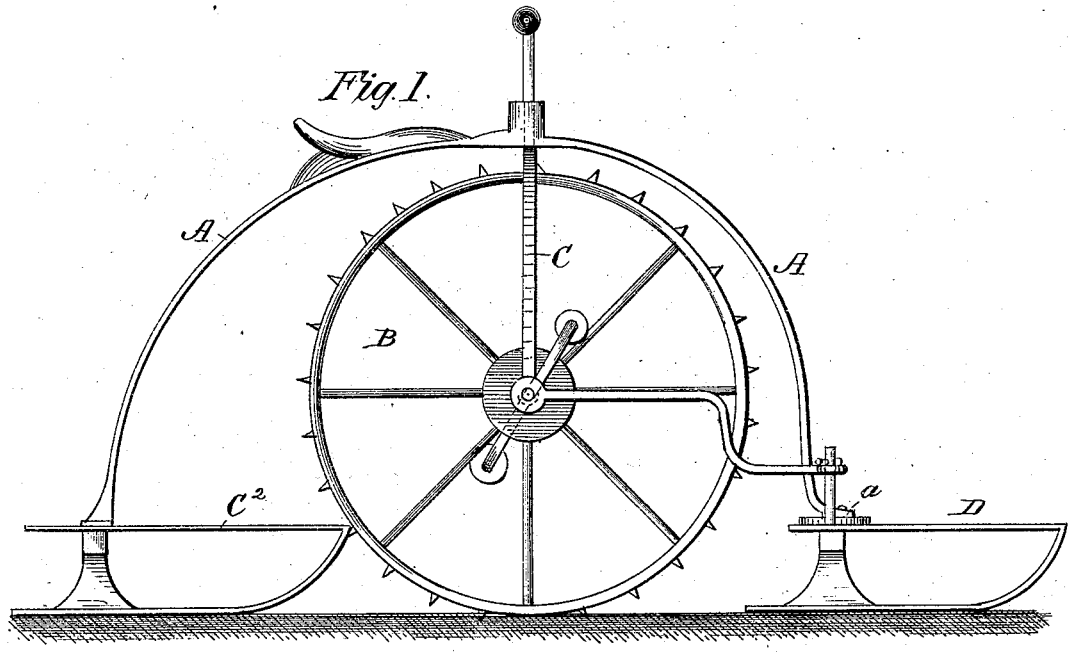
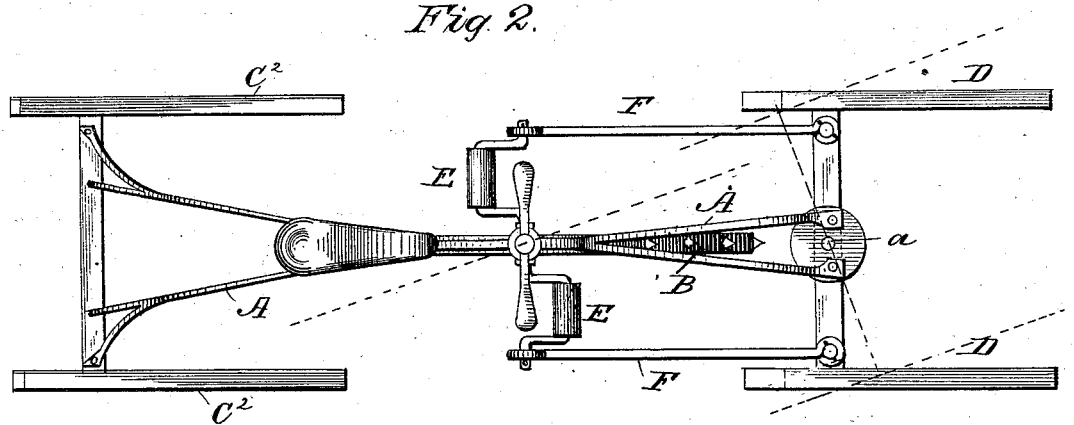
WITNESSES:
Fred. G. Dieterich
Edw. W. Byrn.
INVENTOR:
J. B. Bray
BY
ATTORNEYS.

UNITED STATES PATENT OFFICE.

JAMES B. BRAY, OF WAVERLY, NEW YORK.

VELOCIPEDE-SLEIGH.

SPECIFICATION forming part of Letters Patent No. 256,634, dated April 18, 1882.

Application filed January 24, 1882. (No model.)

*To all whom it may concern:*

Be it known that I, JAMES B. BRAY, of Waverly, in the county of Tioga and State of New York, have invented a new and Improved Velocipede-Sleigh; and I do hereby declare that the following is a full, clear, and exact description of the same, reference being had to the accompanying drawings, forming part of this specification, in which—

Figure 1 is a side elevation, and Fig. 2 a plan view.

The object of my invention is to provide a velocipede-sleigh, or a device to be straddled and driven like a velocipede, but which has also runners, that adapt it to move over roads covered with snow or upon a surface of ice. Vehicles for this purpose have heretofore been invented in which the main frame or backbone was supported upon runners at its rear end and vertically-pivoted runners at its front end, and had a seat on top and a central wheel with spiked periphery, and crank-treadles, by which the same was driven.

My invention relates to this general form; and it consists in arranging the drive-wheel and the front runners upon independent vertical centers, and then connecting the crank-pedals of the drive-wheel to the front runners, whereby the turning of the drive-wheel by the cross-bar at the top is made to also turn the runners in the same direction to secure a more perfect control of the device in turning or guiding it, as will be hereinafter more fully described.

In the drawings, A represents the backbone or main frame. B is the drive-wheel, which has a spiked periphery, and is contained in the forked frame C, swiveling about a vertical bearing in the backbone and terminating in a cross-bar at the top, forming handles. C² are the rear runners, rigidly attached to the backbone at its lower rear end, and D are the front runners, which are connected to the front end of the backbone by a king-bolt, a, which forms a vertical bearing about which the said runners may turn.

Upon each side of the drive-wheel, and rigidly connected with its axis, are the double crank-pedals E, which, at a point concentric with the axis of the wheel, are connected to the front runners by rods F F. Now, in turning the vehicle to guide the same it will be seen that the turning of the main wheel about its vertical center and the turning of the front runners about their vertical center are simultaneously effected through the rods F F with an exactly corresponding degree of deflection and by one and the same adjustment, which, it will be seen, secures the best possible results in guiding the vehicle by causing the plane of the wheel and the direction of propulsion to be always parallel with the plane of the guide-runners.

I do not confine myself to making the front runners to turn and connecting them to the wheel, as shown; but I may make these runners stationary and arrange the rear runners to swivel about a vertical center and connect them to the double crank-pedals.

I may also use other forms of connection than rods F F between the swiveling runners and the crank-axle—such, for instance, as cords or other equivalent means for making the wheels and the runners to turn together.

Having thus described my invention, what I claim as new is—

1. In a velocipede-sleigh having a main drive-wheel and a pair of front and rear runners, the combination, with said drive-wheel arranged to turn on a vertical center, of one of said pair of runners arranged on an independent vertical center and connected with the drive-wheel for a parallel deflection, substantially as shown and described.

2. In a velocipede-sleigh, the combination, with the drive-wheel and the pivoted runners arranged to turn about independent vertical centers, of the double crank-pedals E and the rods F, connected at one end to the cranks at a point concentric with the wheel and by their other ends to the pivoted runners, substantially as described.

The above specification of my invention signed by me in the presence of two subscribing witnesses.

JAMES B. BRAY.

Witnesses:
J. F. SHOEMAKER,
EDWD. W. BYRN.